United States Patent [19]
Cohen

[11] Patent Number: 5,839,748
[45] Date of Patent: Nov. 24, 1998

[54] CONVERTIBLE STROLLER

[76] Inventor: Joan Cohen, 10 Shalimar La., Maple Glen, Pa. 19002

[21] Appl. No.: 62,274

[22] Filed: May 17, 1993

[51] Int. Cl.⁶ ....................................................... B62B 3/02
[52] U.S. Cl. ............................................. 280/648; 280/658
[58] Field of Search .............................. 280/648, 30, 657, 280/658

[56] References Cited

U.S. PATENT DOCUMENTS

| | | |
|---|---|---|
| 1,872,216 | 8/1932 | Appleby ..................................... 280/30 |
| 2,293,560 | 8/1942 | Price . |
| 2,415,146 | 2/1947 | Nanna ....................................... 280/30 |
| 2,593,962 | 4/1952 | Barker . |
| 2,604,333 | 7/1952 | Elmer . |
| 2,869,145 | 1/1959 | Gregory . |
| 2,982,562 | 5/1961 | Gladstein . |
| 3,109,666 | 11/1963 | Wilson . |
| 3,111,332 | 11/1963 | Birch . |
| 3,162,460 | 12/1964 | Davidson . |
| 3,248,125 | 4/1966 | Gill . |
| 3,336,039 | 8/1967 | Chute et al. ............................... 280/30 |
| 4,422,658 | 12/1983 | Hilliard . |
| 5,090,724 | 2/1992 | Fiore ........................................ 280/648 |
| 5,125,674 | 6/1992 | Manuszak ................................. 280/648 |

*Primary Examiner*—Richard M. Camby

[57] ABSTRACT

A child stroller which is convertible between a condition which is adapted to carry a child in a normal sitting position and a condition which is adapted to carry a child in a standing position includes a seat and a step disposable in a location below the seat location, the seat being moveable to permit a child to stand upon the step without interference from the seat.

16 Claims, 2 Drawing Sheets

CONVERTIBLE STROLLER

FIELD OF THE INVENTION

This invention relates to child strollers, i.e. wheeled devices in which a young child may be placed and which may be pushed from place to place for ease in transporting the child. More particularly, this invention relates to a convertible stroller which in one condition is adapted for transporting a child in a normal sitting position and in another condition is adapted for transporting a child in a standing position.

BACKGROUND AND SUMMARY OF THE INVENTION

Many wheeled devices have been proposed or constructed for convenience in transporting a child from place to place. Such devices, having a seat to accommodate a child in a normal sitting position and a handle so that an older child or adult can push the device while walking about, are referred to herein as strollers.

Many strollers or other wheeled child carrying devices have been constructed or proposed which are convertible from one operating condition to another. For instance, many strollers which are commercially available include a reclining back rest which may be placed in a raised position so that the child can sit normally and may be placed in a lowered condition so that the child may recline with his back upon it. Other convertible wheeled devices for carrying children are shown, for instance, in U.S. Pat. Nos. 2,293,560; 2,593,962; 2,604,333; 2,869,145; 2,982,562; 3,109,666; 3,111,332; 3,162,460; 3,248,125; and 4,422,658. However, typical strollers do not permit a child to be conveniently or safely wheeled about while the child is in a standing position. It is not uncommon for a young child or a toddler who has been placed in an ordinary stroller to either attempt to stand in the stroller or to refuse to be carried in the stroller, instead demanding to walk. A child who stands in an ordinary stroller is at risk of injury due to falling out of the stroller, and attempting to maneuver an empty stroller and control a toddler who insists on walking is extremely inconvenient.

Accordingly, it is an object of the invention to provide an improved stroller. The stroller of the present invention is convertible between several conditions, including one condition which is adapted to support the child in an ordinary sitting position and another condition which is adapted to safely transport a child in a standing position. Other objects and features of the present invention will become apparent upon review of the drawings and following specification and claims.

DETAILED DESCRIPTION

Figure 1A:
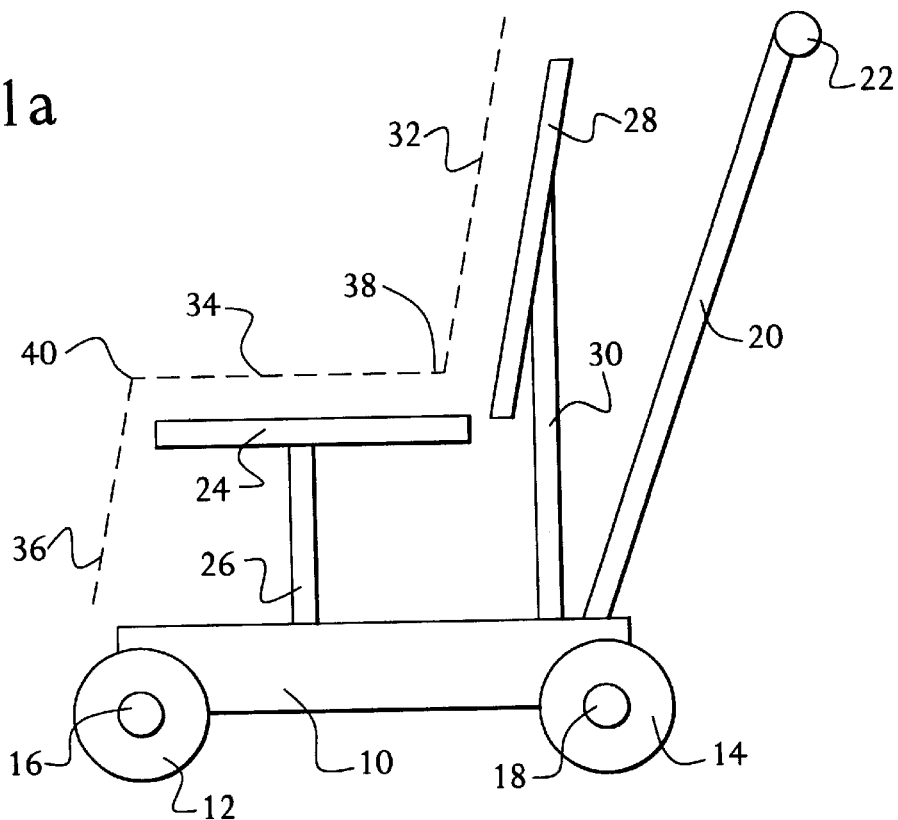
FIG. 1a is a schematic side elevation of a stroller in accordance with the present invention, in a condition adapted to carry a child in an ordinary sitting position.
Figure 1B:
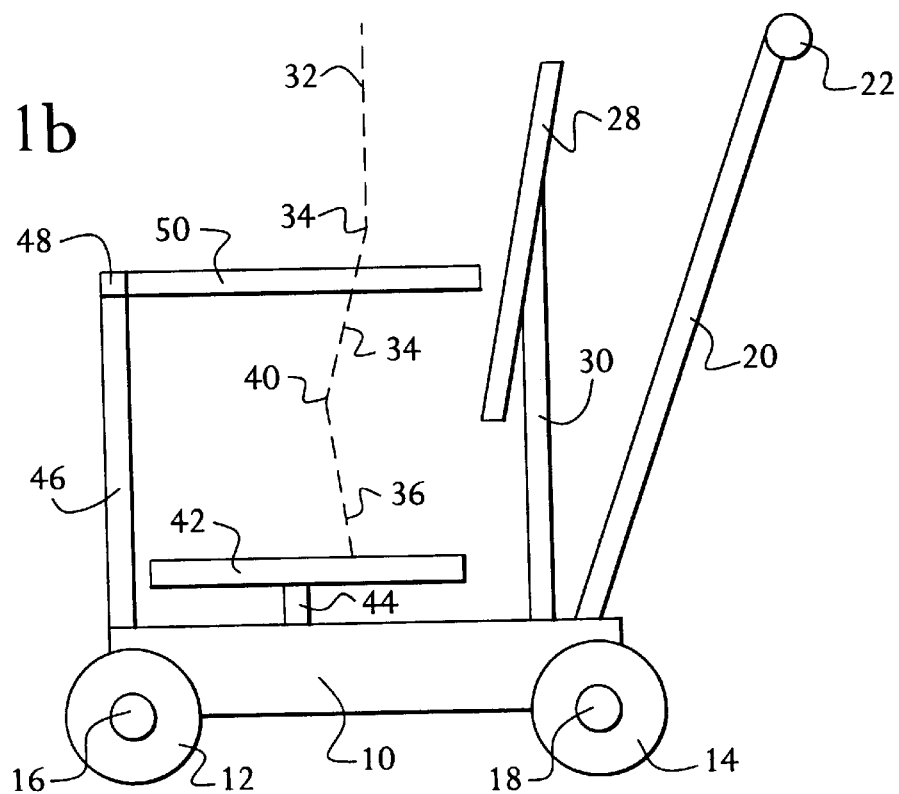
FIG. 1b is a schematic side elevation of the stroller of FIG. 1a, in a condition adapted to carry a child in a standing position.

FIGS. 1a and 1b are schematic side elevations of a stroller in accordance with the present invention, showing in a highly simplified form the principal functional elements of such a stroller. FIG. 1a shows the stroller in a first condition, adapted to carry a child in a normal sitting position. A frame 10 supports a pair of front wheels 12 and a pair of rear wheels 14 (only one wheel of each pair being visible in these Figures) for rotation about axles 16 and 18. A handle 22, which may be grasped to push the stroller, is secured to frame 10 by handle support 20. A generally planar seat 24 is mounted to frame 10 by seat support 26, so that seat 24 is generally horizontally disposed when the wheels are in contact with the ground. A generally planar back 28 is mounted to frame 10 by back support 30, so that the back is generally vertical (but preferably slightly inclined). Seat 24 and back 28 are disposed so that the rear edge of seat 24 is generally adjacent to the lower edge of back 28. As shown in FIG. 1a, the stroller is adapted to carry a child in a normal sitting position, with the child's spine oriented along dotted line segment 32, thighs along segment 34, and lower legs along segment 36, with the hips located at 38 and knees located at 40.

The stroller may be converted to the condition shown in FIG. 1b, which is adapted to carry a child in a standing position. The seat 24 shown in FIG. 1a has been moved to a location where it does not impede or interfere with a child standing on step 42 and therefore is not shown. A generally planar step 42 is provided which is mounted to frame 10 by step support 44, so that step 42 is generally horizontally disposed but at a lower height than seat 24 of FIG. 1a. The step may be present in the structure of FIG. 1a but is not shown in it. The area occupied by step 42 includes an area directly below the area which was occupied by seat 24 in FIG. 1a. Step 42 is adapted to be stood upon by a child, so that the child's back and legs are more or less in the position indicated by the dotted line. Preferably, in the standing configuration of FIG. 1b, the stroller also includes means for inhibiting the child from falling out of the stroller. Preferably, and as illustrated in FIG. 1b, such means include horizontal rails 50, disposed laterally on each side of the standing area, and 48, disposed at the front of the standing area, which are mounted to frame 10 by rail support 46. Rails 48 and 50 are preferably disposed at a height above step 42 such that most stroller-age children can conveniently grasp them to support themselves while standing on step 42.

Figures 2A, 2B:
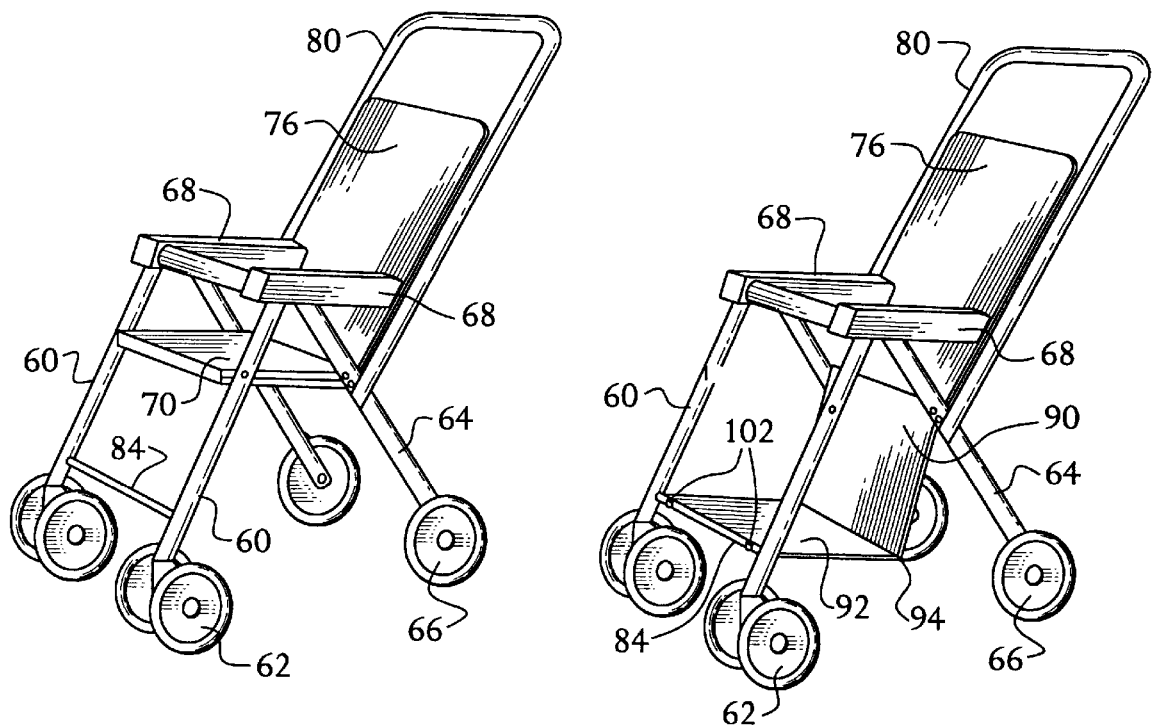
FIG. 2a is a perspective view showing a stroller in accordance with the preferred embodiment of the invention, in a condition adapted to carry a child in an ordinary sitting position.
FIG. 2b is a perspective view showing the stroller of FIG. 2a, in a condition adapted to carry a child in a standing position.

FIGS. 2a and 2b are perspective illustrations of a convertible stroller having the general features illustrated in FIGS. 1a and 1b, and in accordance with the preferred embodiment of the invention. In FIG. 2a, the stroller is in its condition adapted for carrying a child in an ordinary sitting position, in which condition the stroller functions as an ordinary stroller and may have conventional features (such as collapsability and a reclining back) associated with such strollers. A frame, which may be made of tubular metal, includes front legs 60 having front wheels 62 rotatably mounted thereto and rear legs 64 having rear wheels 66 rotatably mounted thereto. The legs are joined to longitudinally oriented, laterally disposed members 68 which function as arm rests in addition to their role in the frame structure. A generally planar seat is secured to the front legs 60 and to rear legs 64. A generally planar back 76 is also secured to the frame. The back and seat may be joined at their lower and rear edges, respectively. A U-shaped member 80 secured to the frame provides a handle which may be grasped to push the stroller and a handle support. A horizontal member 84 may be disposed between the front legs 60 to stabilize them, and may provide a footrest function. A safety bar 86 disposed between the front portions of armrests 68 helps, together with the armrests, to restrain a child in the stroller.

Figure 3:
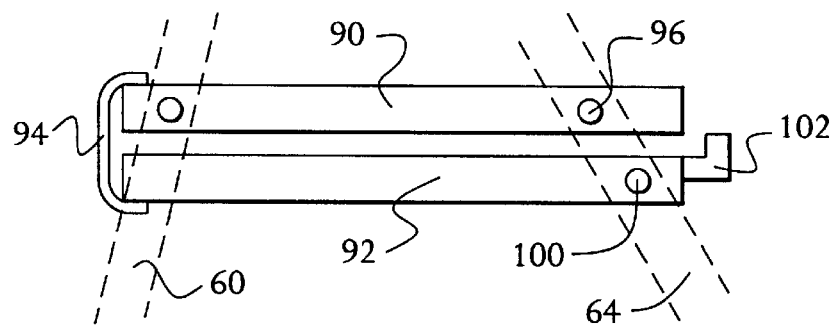
FIG. 3 is a schematic side view of the seat of FIG. 2a, showing the features of the seat which enable conversion of the stroller between conditions.

FIG. 3 is a schematic cross-section of a seat 70 and associated structures which enables the stroller of the preferred embodiment to be converted to a position adapted for standing, as shown in FIG. 2b. Certain frame members are indicated in FIG. 3 by dotted lines. The seat 70 includes an upper panel 90 and a lower panel 92, at least the lower panel 92 being rigid. The upper and lower panels are hingedly connected at their forward edges; they are shown as being hinged by a flexible member 94 secured to each panel but other hinge types may be used. The upper panel 90 is hingedly connected to the rear of the frame by means such as a pin 96 and detachably connected to the front of the frame by means such as a removable pin 98. The front of lower panel 92 is supported from upper panel 90 by the hinge 94; the rear of the lower panel is preferably secured to the rear of the frame, and as shown a removable pin 100 is provided to that end. A detachable securing device such as hook 102 is provided on the rear of panel 92, for reasons which will be discussed in connection with FIG. 2b.

In order to convert the stroller to a condition adapted for standing, the front edge of upper panel 90 and the rear edge of the lower panel are detached from the frame, by removing pins 98 and 100. This permits the upper panel to drop by pivoting counterclockwise about pin 96, and frees panel 92 to pivot about its hinged joint with panel 90. The hook 92 can then be placed over horizontal member 84 so as to detachably secure the lower panel to the frame at a suitably low position. This results in the condition shown in FIG. 2b, in which a child can stand on lower panel 92 which functions as the step of FIG. 1b. When a child stands upon the step, safety bar 86 and arm rests 68 serve to restrain the child and prevent the child from falling while the stroller is moving, and desirably provide a convenient handlehold. The location of upper seat panel 90 in the stroller condition of FIG. 2b supports the rear edge of step 42 and also serves to prevent the child's feet from slipping off the back of the step.

While the stroller structure of FIGS. 2 and 3 as preferred, many variations on that structure or alternative structures having the properties of FIG. 1 are suitable. For instance, the lower panel 92 need not be secured to the rear of the frame in the sitting condition, but may be disposed generally vertically depending from the front edge of upper panel 90 to function as a rest for the backs of the lower legs. A variety of mechanisms may be used to secure or detachably secure the seat and step members to the frame and/or to each other. In the sitting mode, the lower panel 92 may be rigid and detachably secured to the frame, while the upper panel 90 need not be rigid and may be a flexible cushion which is hinged to and lays on top of the rigid lower panel. A single member with three hinged panels may be used to provide back 76, upper seat panel 90, and lower seat panel/step 92. Moreover, the step and the seat need not be cooperatively associated. For instance, a step may be in place near the bottom of the stroller in both the sitting and standing conditions, and a seat may be secured in place to provide the sitting and condition and moved or removed to provide the standing condition. Such a step could also function as a tray or shelf for carrying articles while the stroller is in the sitting condition.

While particular embodiments have been showing and/or described, modifications may no doubt be made without departing from the spirit and scope of the invention.

What is claimed is:

1. A child stroller which is convertible between a sitting condition, in which it is adapted to carry a child in a normal sitting position, and a standing condition, in which it is adapted to carry a child in a standing position, comprising:
    a frame;
    a plurality of wheels rotatably mounted to the frame, the wheels supporting the frame above the ground when they are in contact with the ground;
    a seat which in the stroller's sitting condition is secured to the frame generally horizontally at a height above the ground sufficient to enable a child to sit upon the seat in a normal sitting position; and
    a step which in the stroller's standing condition is secured to the frame generally horizontally at a height above the ground which is lower than the height of the seat in the stroller's sitting condition,
    wherein in said sitting condition said seat is disposed so as to preclude a child from standing on said step.

2. A stroller according to claim 1, wherein said seat and said step are cooperatively associated.

3. A stroller according to claim 2, wherein said seat and said step are hinged to each other.

4. A stroller according to claim 1, wherein said seat is pivotally connected to said frame, whereby said seat may be pivoted during conversion of the stroller between its sitting and standing conditions.

5. A stroller according to claim 1, further comprising means for restraining a child standing on said step from falling from the stroller.

6. A stroller according to claim 5, wherein said restraining means includes laterally disposed arm rests and a forwardly disposed safety bar mounted to said frame, which also restrain a child sitting in the stroller in its sitting condition.

7. A stroller according to claim 1, wherein said step is detachably securable to said frame.

8. A method of converting a wheeled child stroller, which is adapted to carry a child in a normal sitting position upon a generally horizontal seat of the stroller, to a condition adapted to carry a child in a standing position, comprising the steps of:
    providing a generally horizontal step below the location occupied by the seat; and
    moving the seat from a location where it precludes a child from standing on the step to a location where it does not impede a child from standing upon the step.

9. A method according to claim 8, wherein said step providing step and said seat moving step are performed simultaneously by moving a cooperatively associated seat and step.

10. A method according to claim 8, wherein said stroller includes a frame, and said step providing step includes detachably securing a step to said frame.

11. A method according to claim 8, further comprising the step of providing means for restraining a child standing upon the step.

12. A method according to claim 11, wherein said restraining means provided is also operative for restraining a child sitting upon the seat.

13. A child stroller having a seat and a step below the seat, the seat being moveable from a position where it precludes a child from standing on the step to a position in which a child may stand upon the step without interference by the seat.

14. A stroller according to claim 13, further having means for restraining a child when sitting upon the seat or standing upon the step.

15. A stroller according to claim 13, wherein said seat and said step are cooperatively associated.

16. A stroller according to claim 15, wherein said seat and said step are hinged to each other.

* * * * *